US012181081B2

(12) United States Patent
Klose

(10) Patent No.: US 12,181,081 B2
(45) Date of Patent: Dec. 31, 2024

(54) PIPE CONNECTING SYSTEM

(71) Applicant: Airbus Operations GmbH, Hamburg (DE)

(72) Inventor: Markus Klose, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/894,416

(22) Filed: Aug. 24, 2022

(65) Prior Publication Data

US 2023/0066673 A1  Mar. 2, 2023

(30) Foreign Application Priority Data

Sep. 30, 2021  (EP) ..................................... 21200328

(51) Int. Cl.
*F16L 23/04* (2006.01)
*F16L 19/04* (2006.01)
*F16L 27/02* (2006.01)

(52) U.S. Cl.
CPC ............... *F16L 19/04* (2013.01); *F16L 23/04* (2013.01); *F16L 27/026* (2013.01)

(58) Field of Classification Search
CPC ............ F16L 21/06; F16L 17/04; F16L 23/04
See application file for complete search history.

(56) References Cited

U.S. PATENT DOCUMENTS

| | | | | |
|---|---|---|---|---|
| 1,830,782 | A | * | 11/1931 | Burnish .................. F16L 23/04 285/341 |
| 2,588,573 | A | * | 3/1952 | Risley ..................... F16L 21/06 285/379 |
| 3,669,472 | A | | 6/1972 | Nadsady |
| 4,249,786 | A | | 2/1981 | Mahoff |
| 4,438,958 | A | * | 3/1984 | De Cenzo ............... F16L 21/06 439/100 |
| 6,328,352 | B1 | | 12/2001 | Geppert et al. |
| 2016/0153597 | A1 | | 6/2016 | Correa et al. |

FOREIGN PATENT DOCUMENTS

CA    2993703 A1 *   8/2018   .............. F16L 21/06

OTHER PUBLICATIONS

European Search Report from European Application No. 201200328.9 dated Feb. 23, 2022; priority document.

* cited by examiner

*Primary Examiner* — Matthew Troutman
*Assistant Examiner* — Fannie Kee
(74) *Attorney, Agent, or Firm* — Greer. Burns & Crain, Ltd.

(57) ABSTRACT

A pipe connecting system for first and second pipe pieces extending along a common longitudinal axis includes a clamp. The pipe pieces each have first end and first clamping surfaces. The clamp has first and second contact surfaces lying against respective clamping surfaces to prevent the clamping surfaces from moving away from one another, while leaving a space between the first and second end surfaces. A retaining ring has a sealing connection attachment to the second pipe piece, and on which a sealing ring is mounted, the sealing ring lying against a circumferential first sealing surface of the first pipe piece. An interior of the first and second pipe pieces between the two pipe pieces is sealed against the surrounding environment by the sealing connection. The two pipe pieces can move towards one another without the first sealing ring moving out of contact with the first sealing surface.

11 Claims, 2 Drawing Sheets

PIPE CONNECTING SYSTEM

CROSS-REFERENCES TO RELATED APPLICATIONS

This application claims the benefit of the European patent application No. 21193033.4, filed on Aug. 25, 2021, and of the European patent application No. 21200328.9 filed on Sep. 30, 2021, the entire disclosures of which are incorporated herein by way of reference.

FIELD OF THE INVENTION

The present invention relates to a flexible pipe connecting system having a first pipe piece and a second pipe piece that extend along a longitudinal axis, and having a clamp, the connecting system being designed such that it can accommodate angular and axial movements of the pipe pieces relative to one another.

BACKGROUND OF THE INVENTION

In particular in aircraft, fresh water and gray water have to be conducted in the area of the external skin. As a result, during the flight, or when there are low temperatures on the ground, there is a danger of freezing, for which reason these conduits have to be heated by electrical heating conductors attached to the pipe. The resulting large temperature fluctuations cause the corresponding conduits to thermally expand or contract. In addition, there are deformations of the fuselage that the conduits also have to accommodate. This in turn requires that connecting systems between individual pipe conduit segments be designed such that they are tolerant both to changes in length of the joined pipe conduit segments and also to changes in the angle between these (angulation), and that at this point there do not occur any tensions or deformations when there is a change in length or angle in the region of the coupling.

This requirement is even stronger when, in statically tension-free pipe conduit systems, plastic pipes are used instead of the standard metal pipes in order to save weight and cost, because plastic pipes have coefficients of thermal expansion that are one to four times higher but have lower rigidity, so that a coupling is required that is permanently protected against dirt, is flexible, and is smooth-running, and that, when subjected to pressure, does not act as an actuator building up axial forces along the pipe axis, which can cause the flexible pipe material to warp out of the axis. This is achieved in that inside the flexible coupling there occurs no increase in volume and thus no piston effects resulting from the water pressure—an actuator effect can then result only from the material thickness of the pipe wall, and is thus reduced to the minimum that is technically possible.

In order for a pipe connecting system to be tolerant to changes in length and angle and to be able to accommodate them, seals that lie against the pipe pieces connected to one another, and the corresponding sealing surfaces on the pipe pieces, must be designed such that a relative movement between the seals and the pipe pieces is possible. Here, in the past it has turned out to be problematic that, especially in the case of gray water, dirt is deposited in the area of the sealing surfaces, which has the result that the seals can no longer slide along the sealing surfaces, so that changes in length of the pipe conduits can no longer cause a displacement of the pipe end pieces relative to one another in the region of the pipe connecting system.

Therefore, based on the prior art, a task of the present invention is to provide a pipe connecting system that is designed such that it can accommodate changes in length and angle of the pipe conduits connected to one another, while sealing reliably, and in addition largely preventing dirt from depositing in the region of sealing surfaces along which seals move.

SUMMARY OF THE INVENTION

Accordingly, a pipe connecting system according to the present invention has a first pipe piece and a second pipe piece that extend along a common longitudinal axis. In addition, the pipe connecting system according to the present invention has a clamp that is designed to prevent the pipe pieces from moving away from one another.

Here it is to be noted that the pipe pieces can be parts of pipe conduits, for example their end segments, such that the overall pipe conduit then does not also extend along the longitudinal axis; rather, in this case, for example only the respective end segment extends in this way. According to the present invention, the important thing is that the two pipe pieces or segments that are connected to one another run along a common longitudinal axis. According to the present invention, this is already the case when the two terminating surfaces of the pipe pieces that, in the connected state, lie against one another, run parallel to one another, so that at the end of the two pipe pieces the axes along which they extend coincide. In such a case, the feature of a common longitudinal axis, as required by the present invention, is also already realized. In addition, the feature is already realized if the segments of the pipe conduits connected to one another, surrounded by the clamp, extend along a common longitudinal axis. In this case, the pipe pieces are formed by the segments of the pipe conduits that are surrounded by the clamp.

Moreover, on the pipe pieces, preferably a clamping surface oriented away from the respective end surface of the pipe piece is provided that preferably also runs perpendicular to the longitudinal axis of the respective pipe piece, and the clamp preferably has a first and a second contact surface, which are designed to lie against the clamping surfaces of the pipe pieces, the clamp further being designed to prevent the pipe pieces, and preferably the clamping surfaces, from moving away from one another, in particular when the first clamping surface lies against the first contact surface and the second clamping surface lies against the second contact surface.

According to the present invention, in addition, a retaining ring is provided that is attached to the second pipe piece by a sealing connection, a first sealing ring being mounted on the retaining ring, which sealing ring extends around the longitudinal axis along which the pipe pieces extend, and is therefore made in closed annular fashion. In addition, according to the present invention a first sealing surface, extending along the longitudinal axis, is formed on the first pipe piece. Here, the first sealing surface does not necessarily extend over the entire length of the first pipe piece, but only over a part thereof. Preferably, the first sealing surface extends from the free end of the first pipe piece up to the first end surface provided on the first pipe piece.

In the sense of the present invention, a "sealing connection" is to be understood in general as referring to connections in which, through suitable measures taken along the connecting surface, a fluid such as a liquid or gas is prevented from passing through the connecting surface. Accordingly, a "sealing connection" is also formed by the lying of a sealing ring, provided on the retaining ring, against the second pipe piece. A "sealing connection" can equally be formed by a welded, soldered, or press-fit connection. Thus, what is essential for the realization of the feature of a "sealing connection" is tightness against a flow of fluid through the connecting surface.

According to the present invention, the first sealing ring lies against the first sealing surface, so that a sealing connection in the sense of the present invention is also formed between the first sealing ring and the first sealing surface.

Here, according to the present invention the first sealing surface is formed on the outer side, oriented away from the longitudinal axis, of the first pipe piece, which is primarily associated with the advantage that the first sealing surface is exposed only to a small extent to the fluid flowing through the pipe connecting system, so that dirt deposits form thereon only to a small extent.

Finally, the clamp, which is preferably provided with the contact surfaces, as well as the clamping surfaces, are designed and situated such that when the first clamping surface lies against the clamp, and preferably against the first contact surface, and the second clamping surface lies against the clamp and preferably against the second contact surface, an open space is formed between the first end surface and the second end surface, so that the first and the second pipe piece can move towards one another and, to a limited extent, can pivot relative to one another, without the first sealing ring moving out of contact with the first sealing surface. Finally, in this way in the pipe connecting system according to the present invention, an increase in length, caused for example by thermal expansion of the pipe conduits that are used, can be accommodated by the connecting system, in that the pipe pieces inside the clamp can move towards one another to an extent determined by the length of the open space. Moreover, due to the open space the pipe pieces can be pivoted relative to one another to a limited extent.

As already explained, through the pipe connecting system according to the present invention, on the one hand, changes in length of the pipe conduits connected to one another, as well as changes in the angle between them in the area of the connection, can be accommodated, and, on the other hand, due to the fact that the sealing surface against which the first sealing ring lies is formed on the outer side of the first pipe piece, it is exposed to fluid only to a small extent, so that large deposits of dirt cannot occur in this region.

In a preferred specific embodiment, on the first pipe piece a first stop element is provided that is connected to the first pipe piece fixedly, preferably by pressing on, soldering, or welding, and on which the first end surface is formed. With the aid of such a stop element, the provision of the end surface and preferably also the clamping surface on the first pipe piece can easily be realized.

In a further preferred specific embodiment, the retaining ring is connected fixedly to the second pipe piece, preferably by pressing on, soldering, or welding. In this specific embodiment, the retaining ring is therefore connected to the second pipe piece without play, and the sealing connection can be formed by conventional joining methods such as welding, soldering, or pressing on.

It is further preferred if the second end surface is formed on the retaining ring attached fixedly to the second pipe piece. Here it is particularly preferred if the second end surface is situated immediately opposite the first end surface without any further components situated between them. In this preferred specific embodiment, the extent to which the pipe pieces can move towards one another, starting from the configuration in which the clamping surfaces lie against the respective contact surfaces, is determined by the distance between the end surfaces on the retaining ring and the first pipe piece, or the first stop element.

If the retaining ring is connected fixedly to the second pipe piece, it is further preferred that the second clamping surface is also formed on the retaining ring, this ring then being oriented away from the second end surface. Such a design is easily realized in manufacturing by fastening the retaining ring on the pipe piece without having to attach further components to the second pipe piece.

In a further preferred specific embodiment, a second circumferential sealing surface, extending along the longitudinal axis, can be provided on the second pipe piece, a second sealing ring that lies against the second sealing surface and that runs around the longitudinal axis being mounted on the retaining ring, so that the sealing connection between the retaining ring and the second pipe piece is formed by the second sealing ring and the second sealing surface. In this specific embodiment, due to the sealing connection, formed by the second sealing ring and the second sealing surface, between the retaining ring and the second pipe piece, the second pipe piece can also move relative to the clamp, so that, for example, thermally induced changes in length of the pipe conduits connected to one another can be better accommodated. The movability of the two pipe pieces relative to the clamp additionally increases the extent to which the pipe pieces can be pivoted relative to one another.

Further preferably, on the second pipe piece there can be provided a second stop element that is connected fixedly to the second pipe piece, preferably by pressing on, soldering, or welding, and on which the second end surface is formed, the retaining ring being situated between the first and the second end surface. Similar to the explanation above in connection with the first pipe piece, through the second stop element the second end surface, and preferably also the second clamping surface, can easily be provided on the second pipe piece, the extent to which the pipe pieces can move towards one another being determined by the distance between the two stop elements and the axial length of the retaining ring.

Further preferably, the second sealing surface can be situated between the second end surface and a free end of the second pipe piece.

Moreover, here it is preferred that the pipe connecting system is designed such that when the first clamping surface lies against the first contact surface and the second clamping surface lies against the second contact surface, between the first end surface and the second end surface, in the direction of the longitudinal axis, there is a distance that is greater than the length of the retaining ring along the longitudinal direction, the first and the second pipe piece being movable towards one another relative to the clamp in the direction of the longitudinal axis without the first sealing ring moving out of contact with the first sealing surface and without the second sealing ring moving out of contact with the second sealing surface. This choice of the dimensions ensures that, starting from the position in which the clamping surfaces lie against the contact surfaces, the pipe pieces can move towards one another to a predetermined extent, which may for example be required when the pipe pieces, or the pipe conduits connected thereto, undergo thermal expansion.

BRIEF DESCRIPTION OF THE DRAWINGS

In the following, the present invention is explained on the basis of a drawing, which shows only preferred exemplary embodiments.

DETAILED DESCRIPTION OF THE PREFERRED EMBODIMENTS

Figure 1:
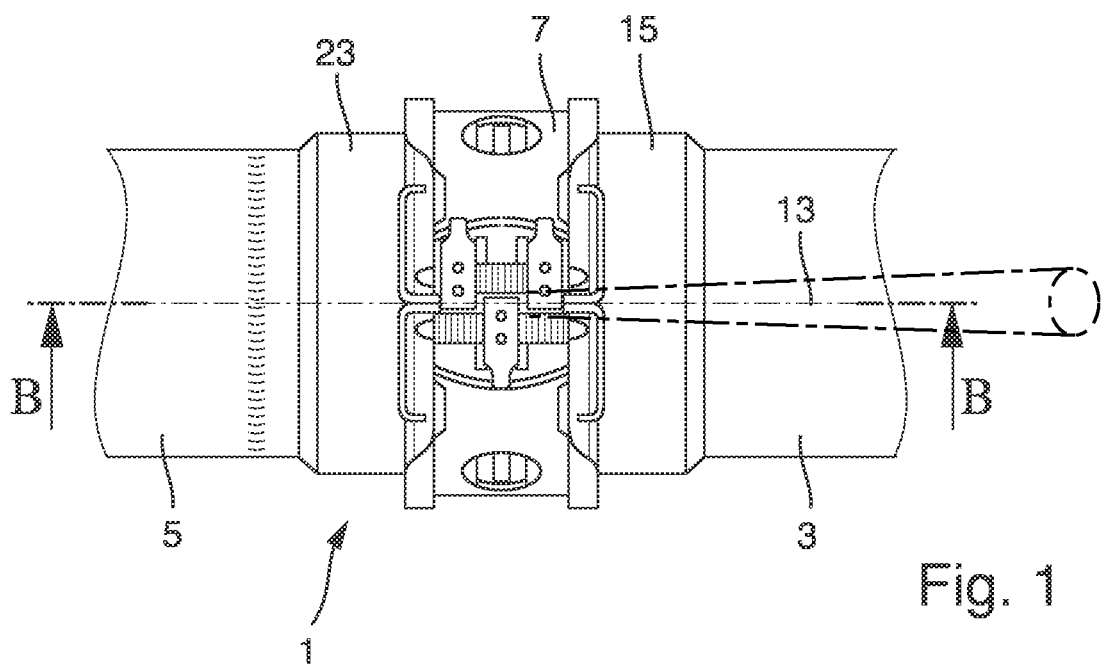
FIG. 1 shows a side view of a first exemplary embodiment of a pipe connecting system according to the present invention.
Figure 2:
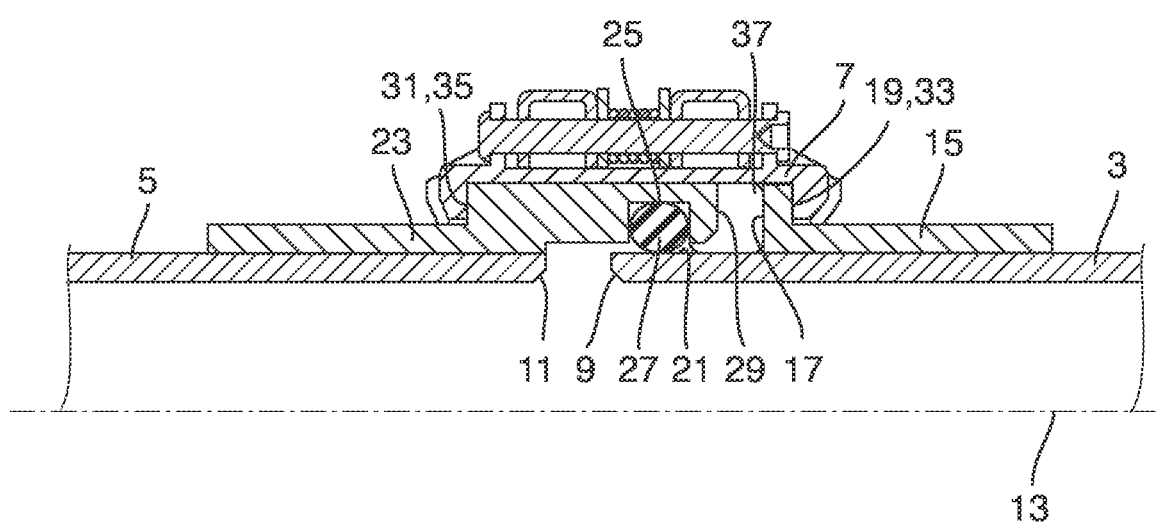
FIG. 2 shows a partial sectional view of the exemplary embodiment of FIG. 1.

FIGS. 1 and 2 show a first exemplary embodiment of a pipe connecting system 1 according to the present invention, pipe connecting system 1 having a first pipe piece 3 and a second pipe piece 5 that are connected to one another with the aid of a clamp 7 in such a way that pipe pieces 3, 5 can move towards one another inside clamp 7. In addition, clamp 7 is dimensioned such that pipe pieces 3, 5 can be pivoted relative to one another to a limited extent, as indicated by the cone in FIG. 1.

Pipe pieces 3, 5 can be part of pipe conduits that do not necessarily have to extend in rectilinear fashion. Only pipe pieces 3, 5, which are coupled to one another in the region of their free ends 9, 11, extend along a common longitudinal axis 13 in the immediate vicinity of these free ends 9, 11. Thus, a pipe connecting system 1 according to the present invention does not have to have pipe pieces 3, 5 that extend in rectilinear fashion over a longer length along a longitudinal axis. Rather, it is completely sufficient if, in the immediate vicinity of free ends 9, 11, thus, for example, in the region surrounded by clamp 7, in each case a rectilinear segment is provided, these segments extending along a common longitudinal axis 13, so that the segments then form pipe pieces 3, 5 in the sense of the present invention.

FIG. 2 further shows that a first stop element 15 is welded onto first pipe piece 3, but here it is, however, also conceivable for first stop element 15 to be simply pressed onto first pipe piece 3, or to be soldered thereto. In any case, there is to be a fixed connection between first stop element 15 and first pipe piece 3, which connection ensures that stop element 15 cannot be displaced relative to first pipe piece 3.

On first stop element 15 there is provided a first end surface 17 that, in the preferred exemplary embodiment shown here, extends substantially perpendicular to longitudinal axis 13 and runs around first pipe piece 3. In addition, first end surface 17 is oriented towards second pipe piece 5. In addition, on first stop element 15 there is also provided a first clamping surface 19 oriented away from first end surface 17, which clamping surface, in the preferred exemplary embodiment shown here, also runs perpendicular to longitudinal axis 13. Finally, in FIG. 2 it can be seen that between first end surface 17 and free end 9 of first pipe piece 3, on the outer side thereof oriented away from the inner side of first pipe piece 3, there is formed a first sealing surface 21; i.e., this segment of the outer side of first pipe piece 3 is realized such that a sealing connection is created in cooperation with a sealing ring.

In addition, FIG. 2 shows that on second pipe piece 5 a retaining ring 23 is fastened to the end segment of second pipe piece 5 by welding, a sealing connection being created between second pipe piece 5 and retaining ring 23 by the welded connection between them, the connection preventing fluid inside pipe pieces 3, 5 from being able to move outward through the connecting surface between retaining ring 23 and the outer side of second pipe piece 5. In retaining ring 23, there is fashioned an inward-facing circumferential groove 25 in which, in turn, a first sealing ring 27 is accommodated that also runs around longitudinal axis 13 and lies against first sealing surface 21, so that a sealing connection is formed between first sealing ring 27 and first sealing surface 21.

In addition, on the free end of retaining ring 23 a second end surface 29 is formed that runs perpendicular to longitudinal axis 13 and also runs around longitudinal axis 13, the second end surface here being situated immediately opposite first end surface 17.

Finally, retaining ring 23 has a second clamping surface 31 that is oriented away from second end surface 29 and also runs perpendicular to longitudinal axis 13 and runs around longitudinal axis 13.

FIG. 2 also shows that clamp 7, which is formed from two half-shells in a known manner, has a first contact surface 33 and a second contact surface 35 that, in the preferred exemplary embodiment described here, also run perpendicular to longitudinal axis 13 and are realized in such a way that first contact surface 33 can lie against first clamping surface 19, while second contact surface 35 can lie against second clamping surface 31. When contact surfaces 33, 35 lie against clamping surfaces 19, 31 in this way, pipe pieces 3, 5 are prevented from moving away from one another along longitudinal axis 13. In addition, retaining ring 23 and first stop element 15 are dimensioned such that when clamping surfaces 19, 31 lie against contact surface 33, 35, an open space 37 is formed between first end surface 17 and second end surface 29. Due to this open space 37, pipe pieces 3, 5 can move towards one another to a certain degree inside clamp 7, so that in this way changes in length, for example due to thermal expansion of the pipe conduits connected to pipe pieces 3, 5, can be compensated. When there is such a movement, first sealing ring 27 remains in contact with first sealing surface 21, but slides along it. In addition, due to open space 37 it is possible for pipe pieces 3, 5 to pivot relative to one another at least to a limited extent, so that a change of the angle between pipe pieces 3, 5 is possible. This is indicated by the cone in FIG. 1. Because, moreover, first sealing surface 21 is formed on the side of pipe pieces 3, 5 oriented away from the inside of pipe pieces 3, 5, this sealing surface 21 comes into contact with the fluid conducted in pipe pieces 3, 5 only to a small extent. As a result, the risk of deposits on first sealing surface 21 is low.

Finally, the surfaces running perpendicular to longitudinal axis 13 on first and second pipe piece 3, 5 are comparatively small, so that a pressurized fluid in the interior of pipe pieces 3, 5 can exert only a low force on them by which pipe pieces 3, 5 would be moved away from one another. Thus, a pressing apart of pipe pieces 3, 5 inside clamp 7 takes place only to a very small extent in the exemplary embodiment described here.

In order to connect the two pipe pieces 3, 5 of the first exemplary embodiment to one another to form a pipe connecting system 1 according to the first exemplary embodiment, first the first pipe piece 3 is pressed into retaining ring 23 with its free end 9, so that first sealing surface 21 formed on first pipe piece 3 comes to lie against first sealing ring 27, first pipe piece 3 then being pushed in far enough that the distance between first and second clamping surfaces 19, 31 is smaller than or equal to the distance between contact surfaces 33, 35 on clamp 7. Subsequently, clamp 7 is placed around retaining ring 23 and first stop element 15, so that pipe pieces 3, 5 can no longer move away from each other. In this way, a connection is produced between the two pipe pieces 3, 5 that, due to open space 37, can in addition accommodate changes in length and angle of the pipe conduits connected to pipe pieces 3, 5.

Figure 3:
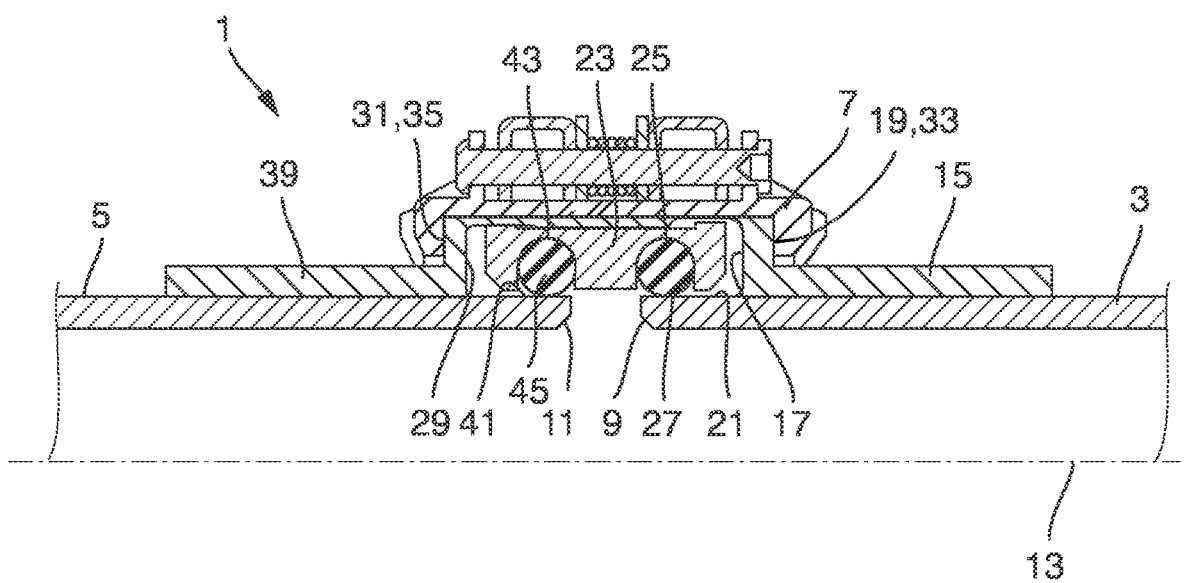
FIG. 3 shows a partial sectional view of a second exemplary embodiment of a pipe connecting system according to the present invention.

FIG. 3 shows a second exemplary embodiment of a pipe connecting system 1 according to the present invention in a partial cross-sectional view, this exemplary embodiment also having a first pipe piece 3 and a second pipe piece 5 that extend along a common longitudinal axis 13 in the region of the connecting system and the region surrounded by clamp 7.

Similar to the first exemplary embodiment, on first pipe piece 3 there is welded a first stop element 15 on which a first end surface 17 and a first clamping surface 19 are formed that, as is also the case in the first exemplary embodiment, run substantially perpendicular to a longitudinal axis 13, and run around it.

In addition, first pipe piece 3 has a first sealing surface 21 that is situated on the side of the wall of first pipe piece 3 oriented away from the interior of first pipe piece 3, and is thus situated on the outer side, and is made so as to run around first pipe piece 3 between first end surface 17 and free end 9 of first pipe piece 3.

Differing from the first exemplary embodiment, a second stop element 39 is also welded onto second pipe piece 5. However, it is also conceivable for second stop element 39 to be pressed onto or to be soldered to second pipe piece 5, adjacent to free end 11. In each case, however, a fixed connection is provided between second pipe piece 5 and second stop element 39. On second stop element 39, there is fashioned a second end surface 29, oriented towards first end surface 17, which in this exemplary embodiment runs substantially perpendicular to longitudinal axis 13, and runs around it. Moreover, second stop element 39 has a second clamping surface 31 that is oriented away from second end surface 29, and is also made perpendicular to longitudinal axis 13, and runs around it.

Finally, between second end surface 29 and free end 11 of second pipe piece 5 there is formed a second sealing surface 41 that is provided on the outer side of second pipe piece 5, oriented away from the inner space thereof.

In addition, FIG. 3 shows that a retaining ring 23 is provided that has an inward-facing first groove 25 and a likewise inward-facing second groove 43. In first groove 25 there is situated a first sealing ring 27 that surrounds first sealing surface 21 and lies against it. In second groove 43 there is situated a second sealing ring 45 that runs around second sealing surface 41 formed on second pipe piece 5, and lies in sealing fashion against it. In this way, a sealing connection is produced between retaining ring 23 and second pipe piece 5, because the lying of second sealing ring 45 against second sealing surface 41 brings it about that the interior of first and of second pipe piece 3, 5 between first pipe piece 3 and second pipe piece 5 is sealed against the surrounding environment. In particular, the seating of second sealing ring 45, as well as its accommodation in second groove 43, ensures that, between second sealing ring 45 and second sealing surface 41 on the one hand and between second sealing ring 45 and second groove 43 on the other hand, no fluid can exit from the interior of pipe pieces 3, 5 through the region between the two end surfaces 9, 11.

Finally, in this exemplary embodiment a clamp 7 is also provided on which a first contact surface 33 is provided that is situated opposite first clamping surface 19. In addition, here as well a second contact surface 35 is also fashioned on clamp 7, which contact surface is situated opposite second clamping surface 31 provided on second stop element 39 when clamp 7 is placed around pipe pieces 3, 5.

When clamping surfaces 19, 31 lie against contact surfaces 33, 35, end surfaces 17, 29 on first stop element 15 and second stop element 39 are far enough from one another that this distance is greater than the axial length, measured in the direction of longitudinal axis 13, of retaining ring 23. Because free ends 9, 11 of pipe pieces 3, 5 are also at a distance from one another, the pipe pieces can move towards one another due to the open space formed between end surfaces 17, 29 and retaining ring 23 when the pipe conduits connected to pipe pieces 3, 5 expand thermally. Moreover, here as well a limited change is possible in the angle between pipe pieces 3, 5. During this, however, first sealing ring 27 always remains in contact with first sealing surface 21, and second sealing ring 45 always remains in contact with second sealing surface 41.

In this second exemplary embodiment as well, sealing surfaces 21, 41 are formed on the side of pipe pieces 3, 5 oriented away from the fluid, so that these sealing surfaces come into contact with the fluid only to a small extent, and only small quantities of dirt, which could impede a displacement of sealing ring 27, 45 relative to sealing surfaces 21, 41, are deposited there.

In order to connect pipe pieces 3, 5 to one another in this second exemplary embodiment, the free ends 9, 11 thereof are first pushed into the inside of retaining ring 23 until clamping surfaces 19, 31 on stop element 15, 39 have a smaller distance from one another than do contact surfaces 33, 35 on clamp 7. Subsequently, the shells of clamp 7 are placed around stop elements 15, 30 and are closed, thus producing the connection.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS 1 pipe connecting system
3 first pipe piece
5 second pipe piece
7 clamp
9 free end—first pipe piece
11 free end—second pipe piece
13 longitudinal axis
15 first stop element
17 first end surface
19 first clamping surface
21 first sealing surface
23 retaining ring
25 first groove
27 first sealing ring
29 second end surface
31 second clamping surface
33 first contact surface
35 second contact surface 37 open space
39 second stop element
41 second sealing surface
43 second groove
45 second sealing ring

The invention claimed is:

1. A pipe connecting system having a first pipe piece and a second pipe piece that extend along a longitudinal axis, comprising:
   a clamp configured to connect the first and the second pipe piece to one another and to prevent the first pipe piece and the second pipe piece from moving away from one another along the longitudinal axis,
   a retaining ring being provided that is attached to the second pipe piece by a sealing connection, and on which a first sealing ring that runs around the longitudinal axis is mounted, wherein the retaining ring has an inward-facing circumferential groove in which the first sealing ring is accommodated so that the sealing connection between the first sealing ring and a circumferential first sealing surface is formed,
   wherein the circumferential first sealing surface extends along the longitudinal axis and against which the first sealing ring lies being provided on the first pipe piece, and wherein the retaining ring is connected fixedly to the second pipe piece,
   an interior of the first and of the second pipe piece between the first pipe piece and the second pipe piece being sealed against a surrounding environment by the sealing connection and the lying of the first sealing ring against the first sealing surface,
   when a first clamping surface on the first pipe piece and a second clamping surface on the second pipe piece lie against the clamp, an open space being formed between a first end surface formed on a first stop element that is connected fixedly to the first pipe piece and a second end surface formed on the retaining ring, and the first and second pipe pieces being able to move towards one another without the first sealing ring moving out of contact with the first sealing surface, wherein the open space is disposed entirely above the first pipe piece, and
   the first sealing surface being provided on the outer side, oriented away from the longitudinal axis, of the first pipe piece.

2. The pipe connecting system according to claim 1, wherein the first end surface is situated opposite the second end surface.

3. The pipe connecting system according to claim 1, wherein the first clamping surface provided on the first pipe piece is oriented away from the first end surface, and
   wherein the second clamping surface provided on the second pipe piece is oriented away from the second end surface.

4. The pipe connecting system according to claim 1, further comprising:
   the clamp having a first contact surface and a second contact surface,
      the first contact surface being configured to lie against the first clamping surface, and the second contact surface being configured to lie against the second clamping surface,
   the clamp being configured to prevent the first and second clamping surfaces from moving away from one another when the first clamping surface lies against the first contact surface and the second clamping surface lies against the second contact surface, and
   when the first clamping surface lies against the first contact surface and the second clamping surface lies against the second contact surface, the open space being formed between the first end surface and the second end surface, and the first and second pipe pieces being able to move towards one another without the first sealing ring moving out of contact with the first sealing surface.

5. The pipe connecting system according to claim 1, wherein the first sealing surface is situated between the first end surface and a free end of the first pipe piece.

6. The pipe connecting system according to claim 1, wherein the first stop element is connected fixedly to the first pipe piece by pressing on, soldering or welding.

7. The pipe connecting system according to claim 1, wherein the first clamping surface is formed on the first stop element.

8. The pipe connecting system according to claim 1, wherein the retaining ring is connected fixedly to the second pipe piece by pressing on, soldering, or welding.

9. The pipe connecting system according to claim 1, wherein the second clamping surface is formed on the retaining ring.

10. The pipe connecting system according to claim 1, wherein the open space is configured to permit the first pipe piece to pivot relative to said second pipe piece about a pivot axis perpendicular to said longitudinal axis.

11. The pipe connecting system according to claim 1, wherein the retaining ring includes a flange which is flush with a portion of an outer surface of the second pipe piece.

* * * * *